Dec. 14, 1926.
E. REICH
FOOD CHOPPER
Filed Jan. 19, 1923      2 Sheets-Sheet 2
1,610,322
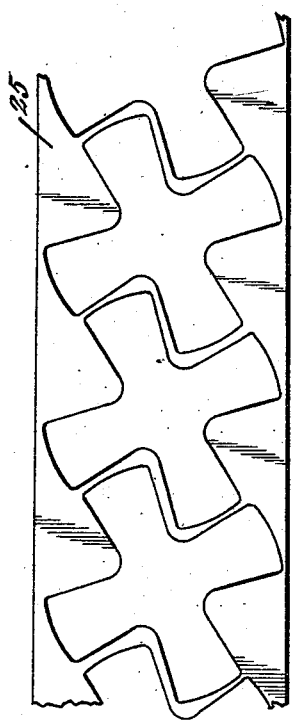
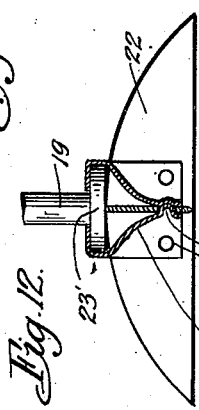
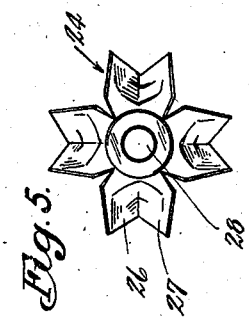
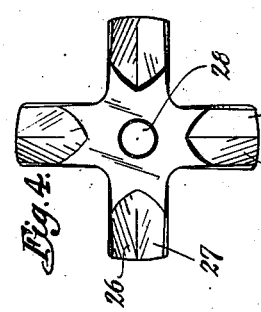
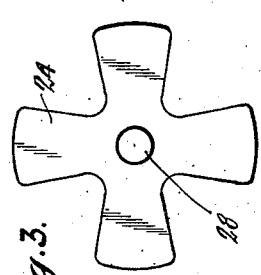
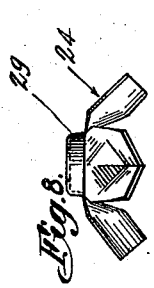
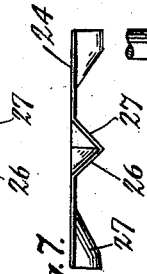
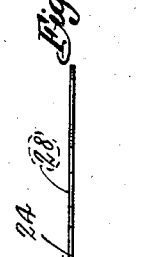
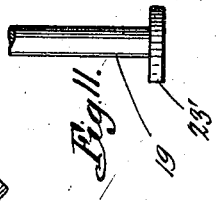
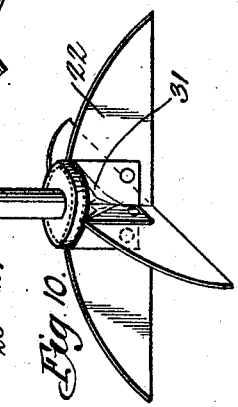
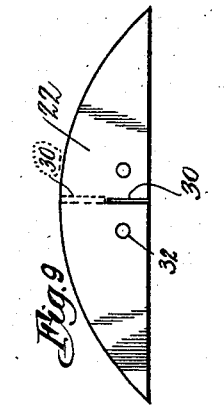
INVENTOR.
ERNEST REICH
BY
Henry Blech
ATTORNEY.

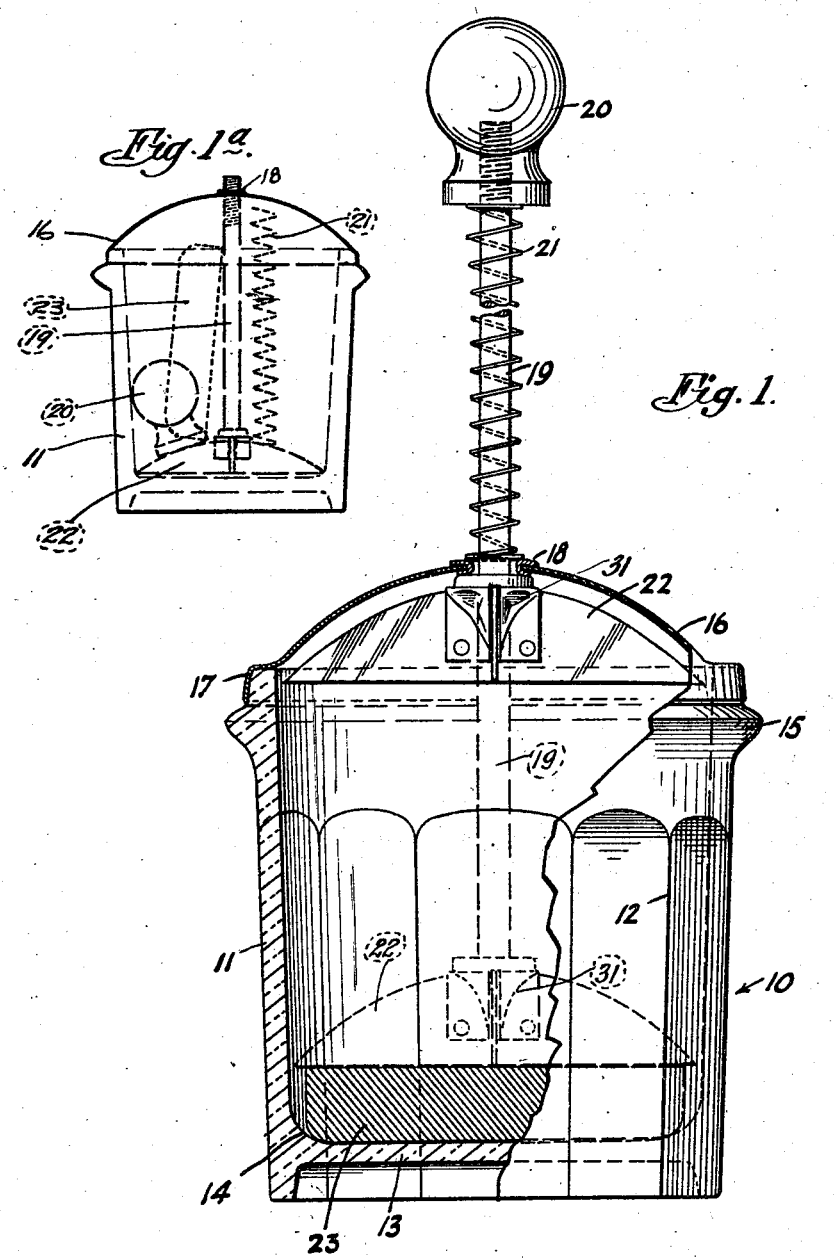

Patented Dec. 14, 1926.

1,610,322

UNITED STATES PATENT OFFICE.

ERNEST REICH, OF CHICAGO, ILLINOIS, ASSIGNOR TO ERNEST REICH COMPANY, OF CHICAGO, ILLINOIS, A CORPORATION OF ILLINOIS.

FOOD CHOPPER.

Application filed January 19, 1923. Serial No. 613,626.

The invention broadly concerns food choppers and more particularly a device for chopping or cutting fruits and vegetables.

It is an object of the invention to provide a device which completely encases the article to be cut and which permits the cutting operation to be performed while the article is thus encased.

A further object constitutes the provision of a device having cutters interiorly arranged for reciprocation, there being a stripper action at the end of the idle stroke of the cutters to relieve the latter of adhering parts.

It is another object of the invention to provide a special bearing for the spindle to which the cutters are attached so that if necessary the reciprocation of the cutters may be obtained under an angle to the vertical in order to reach every portion of the article to be cut.

Another object constitutes the provision of a glass container whose wall is tapered on the inside with the smallest diameter at the bottom and just large enough to accommodate the cutters, so that even upon other than vertical reciprocation the cutters in final position are in centered relation.

A further object aims at providing in the center of the cover for the glass container an eyelet through which extends the cutter spindle or shank and which permits slanting arrangement of the shank while reciprocating.

Another object constitutes the provision of a device which is sanitary, easily cleaned and whose parts are readily accessible.

It is also an object to provide in the container a wooden block whose lower circumferential edge is rounded and opposed to a rounded portion of the container, so that the block under the impact of the cutters is self adjusting.

It is a further object to provide a novel method for securing the cutter blades to the spindle whereby the cost of producing these parts is greatly reduced and the efficiency thereof enhanced.

With these and other equally important objects in view, the invention comprises the means described in the following specification particularly pointed out in the claims forming a part thereof, and illustrated in the accompanying drawings, in which Fig. 1 is partly front view, partly sectional elevation of a device constructed in accordance with my invention.

Fig. 1ª is a diagrammatic view showing the device in compact or knock-down arrangement ready for shipment.

Fig. 2 is a plan view of a blank from which a number of holding members for the cutter blades have been stamped out.

Figs. 3 and 6 are plan and front views of a holding member.

Figs. 4 and 7 show in plan and front view the holding member after the first forming operation.

Figs. 5 and 8 show in plan and front view the holder member during a succeeding operation.

Fig. 9 is a view of a blade.

Fig. 10 is a perspective view of a portion of a spindle together with the cutter blades and holding member, and Fig. 11 is a front view of the spindle.

Fig. 12 is a detailed section.

Referring particularly to Fig. 1 of the drawing 10 designates a vitreous container which is formed with a paneled wall 11 thereby possessing a plurality of longitudinal ribs 12.

The wall 11 extends beyond the bottom 13 to prevent contact of the latter with a support or table. The side wall merges into the bottom in a comparatively large curve as at 14 for the purpose hereinafter referred to.

The inner side of the wall 11 tapers slightly so that the inside diameter of the wall at the top is larger than at the bottom. Near the upper end the wall is equipped with a circumferential bead 15.

A spherical cover 16 closes the open end of the container and terminates at the lower end in a flange 17 to encompass the upper end of the wall. The cover is provided at the center with an aperture and an eyelet 18 is riveted to the cover and constitutes a universal bearing for a spindle or rod 19. The rod has threadedly secured to its upper end a knob 20 and a helical spring 21 encircles the rod and is interposed between the knob 20 and the cover, whereby the rod is normally maintained in its upper end position.

To the lower end of the rod a plurality of blades 22 are secured which, upon reciprocation of the rod, cut or chop food arranged upon a board 23, which rests on the container bottom. The lower circumferential edge of the board is curved so that the board can adjust itself under the impact of the cutter.

The blades 22 are of size to fit in the cover part of the container, and by reason of the larger diameter of the container at the top, the rod may be reciprocated under an oblique angle so that every portion of the food may be subjected to the cutting action.

Of course, in the lower end position the blades will be centered owing to the taper of the container.

The oblique arrangement of the rod is possible by virtue of the eyelet bearing 18 through which the rod reciprocates.

Attention is called to the fact that the upper edge of the blades corresponds to the form of the cover, so that in the upstroke of the rod caused by the spring 19 a stripper action is set up by the cover to remove food particles adhering to the blades.

The device is distinguished thereby that all its parts are easily accessible, readily cleaned and thus very sanitary. It furthermore is important that the food during the cutting operation is completely encased, permitting the cutting of vegetables giving off pungent gases without harmful effects on a person.

The provision of the ribs 12 on the container permits convenient rotation thereof to bring all parts of the food in juxtaposition with the blades.

The device can be conveniently disassembled and compactly arranged for shipping purposes, so that in knockdown arrangement it occupies substantially no more space than the container proper.

To this end the knob 20 is removed from the rod, the spring 19 slid off from the rod and both knob and spring are placed in the container after the board 23 has been removed. The rod is lowered in the container until the blades engage the bottom 13 and only slightly protrudes above the cover. The board is then placed in vertical position in the container and bears on the blades as indicated in Fig. 1ª.

The manner of securing the blades to the rod is illustrated in Figs. 2 to 11.

As shown in Fig. 10, four blades 22 are arranged at right angles to each other.

The rod 19 is provided at the lower end with a head 23. To secure the blades to the rod a retaining member generally designated by 24 is provided.

This member is stamped out from a blank 25 and in original form resembles a four-leaf clover leaf as appears from Fig. 3. The member is then subjected to a forming operation whereby each leaf is depressed so that it has the synclinal planes 26 and 27. The center of the member is apertured as at 28.

In a succeeding forming operation the member 24 is given the form shown in Figs. 5 and 8 in which the member is provided with an embossment 29 adapted to encase the rod head 23 after the rod 19 is inserted through the aperture 28. The free ends of the leaves of member 24 are then brought together but leave a space sufficient to introduce the blades 22.

The blades are provided with central slit 30, co-operating blades having a slit at the bottom and top respectively so that appertaining blades may be arranged to cross each other at right angles. In Fig. 9 the top slit is indicated in dotted lines.

Attention is called to the fact that the member 24 is formed with embossments or wedges 31 which form a gradual incline from the blade 22 and act as spreaders to support the cutting action of the blades. In other words the wedges 31 serve to further spread apart the cut portions of the food and do not exercise a crushing action. The blades 22 are formed with holes 32 and in order to secure the blades to the member 24, the portion thereof opposite to the holes is punched thereinto.

The blades and holding member as immersed in a tin bath to prevent rusting of these parts and to eliminate unevenness by reason of flaws.

The use of the device is thought to be readily understood by reference to Fig. 1.

If by way of example an apple is to be chopped; the cover 16 together with the parts associated therewith is raised and the apple placed on the board 23. Thereupon the cover is arranged in the position shown in Fig. 1 and the rod 19 is lowered by pressure being brought to bear on the knob 20. This downstroke of the rod and blades 22 effects a cutting action on the apple. Upon release of the pressure the spring 19 which during the downstroke has been compressed now expands and forces the rod and blades into the elevated or normal position. Prior to the succeeding downstroke of the blades 22, either the knob 20 or the container 10 is slightly turned so that an uncut portion of the apple is presented to the cutting edges of the blades. The provision of the ribs 12 on the container facilitates turning thereof.

The device illustrated in the drawings forms a preferred embodiment of the invention and constitutes but one of various ways in which the principle of the invention may be utilized.

Numerous changes and alterations may be made within the scope of the invention as defined in the appended claims.

I claim:

1. In combination with a rod headed at one end, an apertured member resting on the rod head with the rod extending through the aperture, and a plurality of blades secured to said member.

2. In combination with a rod headed at one end, an apertured member resting on the rod head with the rod extending through the aperture, a plurality of blades secured to said member, and means for augmenting the cutting action of said blades.

3. In combination with a rod headed at one end, an apertured member resting on the rod head with the rod extending through the aperture, a plurality of blades secured to said member, and wedges on said member for supporting the cutting action of said blades.

4. A device of the character described, including a container, a cover therefor having a central aperture, a rod in said aperture having a knob threadedly secured to the upper end and a cutter permanently secured to the lower end, a spring interposed between said cover and said knob to normally maintain said cutter in elevated position, and a board in said container against which the cutter acts, said container housing the disassembled spring and knob with said board arranged in vertical position resting on said cutter.

In witness whereof I affix my signature.

ERNEST REICH.